US008384628B2

(12) United States Patent
Mathea et al.

(10) Patent No.: US 8,384,628 B2
(45) Date of Patent: Feb. 26, 2013

(54) DOCUMENT WITH AN INTEGRATED DISPLAY DEVICE

(75) Inventors: Arthur Mathea, Berlin (DE); Jörg Fischer, Berlin (DE); Manfred Paeschke, Wandlitz (DE); Malte Pflughoefft, Berlin (DE); Oliver Muth, Berlin (DE)

(73) Assignee: Bundesdruckerei GmbH, Berlin (DE)

( * ) Notice: Subject to any disclaimer, the term of this patent is extended or adjusted under 35 U.S.C. 154(b) by 331 days.

(21) Appl. No.: 12/742,150

(22) PCT Filed: Nov. 4, 2008

(86) PCT No.: PCT/EP2008/064896

§ 371 (c)(1), (2), (4) Date: Aug. 9, 2010

(87) PCT Pub. No.: WO2009/062855

PCT Pub. Date: May 22, 2009

(65) Prior Publication Data

US 2010/0295878 A1 Nov. 25, 2010

(30) Foreign Application Priority Data

Nov. 12, 2007 (DE) ........................ 10 2007 000 888

(51) Int. Cl.

| | |
|---|---|
| ***G09G 3/30*** | (2006.01) |
| ***G09G 5/00*** | (2006.01) |
| ***G09G 5/10*** | (2006.01) |
| ***G09G 5/02*** | (2006.01) |
| ***G09G 3/32*** | (2006.01) |
| ***G09G 3/36*** | (2006.01) |
| ***G06F 3/038*** | (2006.01) |
| ***H04N 7/167*** | (2011.01) |

(52) U.S. Cl. .......... 345/77; 345/204; 345/690; 345/694; 345/76; 345/82; 345/94; 380/200

(58) Field of Classification Search .............. 345/76–83, 345/694, 690, 94; 380/200–242

See application file for complete search history.

(56) References Cited

U.S. PATENT DOCUMENTS

| | | | |
|---|---|---|---|
| 5,657,008 | A | 8/1997 | Bantli |
| 6,019,284 | A | 2/2000 | Freeman et al. |

(Continued)

FOREIGN PATENT DOCUMENTS

| | | |
|---|---|---|
| DE | 201 00 158 U1 | 6/2002 |
| DE | 102 15 398 B4 | 10/2003 |

(Continued)

OTHER PUBLICATIONS

"Machine Readable Travel Document", Technical Report, PKI for Machine Readable Travel Documents Offering ICC Read-Only Access, Version 1.1, Oct. 1, 2004, International Civil Aviation Organization (ICAO).

(Continued)

*Primary Examiner* — Bipin Shalwala
*Assistant Examiner* — Ilana Spar
(74) *Attorney, Agent, or Firm* — Timothy X. Gibson, Esq.; Gibson & Dernier LLP

(57) ABSTRACT

A document including an integrated display device that has several triggerable display elements, each of which is designed to emit an optical signal for representing first data stored in the document whereby the display device is designed for cyclical activation of the display elements for rendering the first data in sequential image regeneration periods, and whereby the display device is designed in such a way that the emission of the optical signals of at least a subset of the display element takes place with a chronological delay, whereby it is not possible to visually perceive the chronological delay.

15 Claims, 5 Drawing Sheets

U.S. PATENT DOCUMENTS

| | | | | |
|---|---|---|---|---|
| 6,402,039 | B1 | 6/2002 | Freeman et al. | |
| 6,902,115 | B2 | 6/2005 | Graf et al. | |
| 6,966,497 | B1 | 11/2005 | Hohmann et al. | |
| 7,440,771 | B2 | 10/2008 | Purk | |
| 7,486,346 | B2 | 2/2009 | Kluge | |
| 2003/0231150 | A1 * | 12/2003 | Yuki | 345/76 |
| 2004/0056083 | A1 | 3/2004 | Graf et al. | |
| 2004/0171406 | A1 | 9/2004 | Purk | |
| 2004/0263431 | A1 | 12/2004 | Hohmann et al. | |
| 2006/0025053 | A1 | 2/2006 | Cyrille | |
| 2007/0285361 | A1 | 12/2007 | Jovanovich | |
| 2008/0195858 | A1 | 8/2008 | Nguyen | |
| 2008/0278469 | A1 | 11/2008 | Terliuc et al. | |

FOREIGN PATENT DOCUMENTS

| | | | |
|---|---|---|---|
| DE | 10 2004 008 841 | A1 | 9/2004 |
| DE | 10 2005 025 806 | A1 | 12/2006 |
| DE | 10 2005 030 626 | A1 | 1/2007 |
| DE | 10 2005 030 627 | A1 | 1/2007 |
| DE | 10 2005 030 628 | A1 | 1/2007 |
| EP | 0 920 675 | B1 | 6/1999 |
| EP | 1094435 | A2 | 4/2001 |
| EP | 1 230 617 | A2 | 8/2002 |
| EP | 1 173 825 | B1 | 11/2002 |
| EP | 1 303 835 | B1 | 4/2003 |
| EP | 1 023 692 | B1 | 10/2003 |
| EP | 1 537 528 | B1 | 6/2005 |
| WO | 99/08910 | A | 2/1999 |
| WO | 99/38117 | A1 | 7/1999 |
| WO | 03/030096 | A1 | 4/2003 |
| WO | 2004002552 | A1 | 3/2004 |
| WO | 2004/080100 | A1 | 9/2004 |
| WO | 2007054944 | A1 | 5/2007 |
| WO | 2007/137555 | A2 | 12/2007 |

OTHER PUBLICATIONS

Combined various English language abstracts for: DE201 00 158, DE10 2004 008 841, DE10 2005 030 626, DE10 2005 030 627, DE10 2005 030 628 and EP1 023 692.

International Search Report for corresponding application PCT/EP2008/064896, dated Jun. 10, 2009 PCT/ISA/210.

Tsuboi, Taiju; Murayama, Hideyuki; Penzkofer, Alfons (2006) Photoluminescence Characteristics of Ir(ppy)3 and PtOEP doped in TPD Host Material. Thin Solid Films, 499 (1-2). pp. 306-312. ISSN 0040-6090.

International Preliminary Report on Patentability and Written Opinion for corresponding application PCT/EP2008/064896, dated Jun. 1, 2010 PCT/IB/373/ISA/237.

* cited by examiner 100
102
103
103
122
123
104

L1
L2
L3
L4
L5
Logic
Driver Circuit
Frame Buffer
LI1
LI2
LI3
LI4
LI5
118
1
2
3
4
5
144
142
106
126
Memory
I1
I2
I3
I4
I5
Chip
128
131
132
Processor
Program instructions
Rendering 148
150
154
154
154
154
154
154
154
154
ΔT

DOCUMENT WITH AN INTEGRATED DISPLAY DEVICE

CROSS REFERENCE TO RELATED APPLICATIONS

This application claims priority to International Patent Application No.: PCT/EP2008/064896, filed Nov. 4, 2008, the entire disclosure of which is hereby incorporated by reference.

FIELD OF THE INVENTION

The present invention concerns a document with an integrated display device, in particular a document of value or security document, a reader as well as a method for the verification of a document.

BACKGROUND

Documents with an integrated electronic circuit are known from prior art in various forms per se. For example, there are documents of value and security documents in primarily paper-based form such as, for example, bank notes, electronic passports, or as plastic-based chip card, in particular the so-called smart card in the form of contact cards, contactless or with dual interface design. Concerning such, reference is made in particular to DE 10 2005 025 806.

In particular, various radio recognition systems are known in prior art for such documents, which are also called radio frequency identification systems (RFID). Previously known RFID systems generally include at least a transponder and a send/receive unit. The transponder is also referred to as RFID-etiquette, RFID chip, RFID tag, RFID label or radio etiquette; the send/receive unit is also identified as reading device, reading unit or reader. Further, often the integration with servers, services and other systems is provided by means of so-called middle ware with, for example, cash register systems or inventory management systems.

The data that is stored, for example, on a contactless RFID transponder are made available by means of radio waves. At low frequencies this takes place inductively via a near field, at higher frequencies, via an electromagnetic distant field.

Usually, an RFID transponder includes a microchip and an antenna, that are housed in a carrier or housing or are printed onto a substrate. In contrast to passive transponders, active RFID transponders, also have an energy source such as, for example a battery.

RFID transponders can be used for various documents, in particular in chip cards, for example, for the realization of an electronic purse or for electronic ticketing. Moreover, these are integrated in paper or in plastic such as, for example, in documents of value or security documents, in particular bank notes and identification documents.

From DE 201 00 158 U1, for example, an identification and security card made of laminated and/or extruded plastic is known, that contains an integrated semiconductor with an antenna for performing an RFID process. Further, from DE 10 2004 008 841 A1 a book-like document of value such as, for example, a passport book that contains a transponder unit is known.

These types of security documents and documents of value can have integrated display devices of the type that are known, for example, from DE 10 2005 030 626 A1, DE 10 2005 030 627 A1, DE 10 2005 030 628 A1, WO 2004/080100 A1, EP 1 023 692 B1, DE 102 15 398 B4, EP 1 173 825 B1, EP 1 230 617 B1, EP 1 303 835 B1, EP 1 537 528 B1, WO 03/030096 A1, EP 0 920 675 B1, U.S. Pat. No. 6,019,284, U.S. Pat. No. 6,402,039 B1, WO 99/38117.

Security documents or documents of value can be equipped with a contact interface or a contactless interface, for example, an RFID interface, or with an interface that permits wired as well as wireless communication with a chip card terminal. In the latter case, one also speaks of so-called dual interface chip cards. Chip card communication protocols and procedures are specified, for example in the ISO 7816, ISO 14443, ISO 15763 standards.

A disadvantage of such documents with RFID functionality is, that without the agreement of the carrier of the document, the RFID interface can be activated, A protection mechanism for travel documents to protect against unauthorized reading of the data in such documents is known as basic access control, compare: "Machine Readable Travel Document", Technical Report, PKI for Machine Readable Travel Documents Offering ICC Read-Only Access, Version 1.1, Oct. 1, 2004, International Civil Aviation Organization (ICAO). A method for the special protection of biometric data, i.e. the so-called extended access control is known, for example, from DE 10 2005 025 806, which was mentioned above already.

From the, at the time of the application, unpublished patent application DE 10 2006 031 422.0-53 of the same applicant, a document of value or a security document is known with a display device for emitting machine-readable optical signals, which cannot be cognitively perceived by a user.

From WO 2007/137555 A2, a motor vehicle identification display is known that can be configured electronically. To configure the motor vehicle identification, data are collected in an external configuration unit and encrypted. The encrypted data is transmitted by an infrared sender that is integrated into the configuration unit as infrared signals. In the display electronics for the motor vehicle identification, the signals are decrypted, for which reason corresponding decryption software is stored in the display electronics. Further electronic motor vehicle identification is known from U.S. Pat. No. 5,657,008 and US 2007/0285361 A1.

SUMMARY OF THE INVENTION

In contrast, the invention is based on the problem of creating an improved document, a reader for a document and a method for verification of a document.

According to embodiments of the invention, a document with an integrated display device is created that has several display elements that can be activated. Each of the display elements is designed to emit an optical signal, so that image data stored in the memory of the document can be rendered for on the display device visual capture by a user. The activation of the display elements takes place cyclically repetitive with a certain image regeneration frequency of, for example, 25 Hz or 50 Hz. In each image regeneration, each display element is activated in order to emit an optical signal, which contributes to the rendering of the stored data. Thus, by means of each of the display elements, a so-called pixel or subpixel is realized, for example.

In the case of a subset of the display device, the emission of the optical signals takes place within the image regeneration period with a chronological delay, whereby the chronological delay is so short that it cannot be perceived visually. In particular, the chronological delay is significantly shorter than the length of an image regeneration period and also significantly shorter than the length of a period that activates a line of the matrix. The visual impression of the rendition of the data stored in the document thus does not change as a result of the chronological delay.

The chronological delay of the emission of the optical signals of a subset of the display elements especially has the advantage, that with it, the re-creation of a document in accordance with the invention is made more difficult. First, the forger does not receive any knowledge of the fact the emission of the optical signals by the subset of the display elements takes place with a delay, as this delay cannot be visually perceived with the naked eye.

Further, the delay of the emission of the optical signals can only relate to a subsection of the document, as a result of which the re-creation of the subsection of the document is made more difficult, as a forger cannot know where this subsection of the document is located.

According to one embodiment of the invention, information is coded into the length of the chronological delay. For example, in a first image regeneration period the rendering of the data for all display elements takes place without a chronological delay. This corresponds, for example, to a logical zero. In a subsequent second image regeneration period, the rendering of the data by the display elements takes place with a chronological delay, representing a logical one.

Alternatively, in a certain image regeneration period, the emission of the optical signals occurs with a chronological delay only in a subset of the display elements, which is identical for all display elements of the subset, whereas the emission of the optical signals by means of the remaining display elements of the display device, which are not a part of the subset, takes place without or with a chronological delay that is different than that of this subset. Because of the fact that a chronological delay occurs in the emission of the optical signals of the subset of the display elements, a security feature of the document is given.

According to an embodiment of the invention, information is coded into the spatial configuration of the display elements of the subset. For example, the display elements of the subset form a certain pattern on the display device as the result of their spatial configuration. In turn, this pattern can provide a security feature.

According to an embodiment of the invention, the document has means for delaying the activation of the display elements that are a part of the subset. For example, the means for delaying the activation are realized on the level of the driver logic.

According to an embodiment of the invention, the display device is an active matrix display, whereby each one of the display elements has an associated activation circuit. In this embodiment, the means for delaying the activation can be realized on the level of the activation circuit.

According to an embodiment of the invention, the lines of the matrix and/or lines of columns are for the activation of the display elements. In this embodiment, means for delaying the activation can be realized on the level of the lines of the matrix and or on the column lines According to an embodiment of the invention, the display elements of the subset have a response characteristic that leads to the delay. All of the display elements of the display device, including the display elements that are a part of the subset are activated in the same way within an image regeneration period. The chronological delay of the emission of the optical signals by the display elements of the subset is substantiated here by the response characteristic of the display elements that belong to the subset, which deviates from the response characteristic of the display elements that do not belong to the subset.

This deviating response characteristic can, for example, be constrained by, that the display elements of the subset have a different luminescent substance than the display elements that do not belong to the subset. For example, for the display elements of the subset, a luminescent substance can be used that has a somewhat longer fade-out time and thus also a delayed response behavior compared to the luminescent substance used for the remaining display elements. In the case of the subset it can, for example, be the quantity of subpixels that pertain to a color.

According to an embodiment of the invention, all display elements of the display device or all display elements of the display device that are used for illustrating a certain color, for example, red—have the same luminescent substance such as, for example compounds with traces of europium. In this embodiment, a deviating response characteristic of the display elements of the subset results because these display elements have a different host crystal for the luminescent substance than the remaining display elements. In a further embodiment, the subset includes those display elements with the special response characteristic that is used to represent a certain color.

As a result of this, the document is secured against an exchange of the display device with a commercial display device.

A further embodiment in accordance with the invention provides that in addition to the characteristic response and/or decay characteristics, the spectral characteristic is used for authentication. For example, the compounds with traces of europium that are mentioned above, do not only have different life cycles, but also differentiate themselves in the exact position or the intensity relationships of the emission lines.

According to an embodiment of the invention, the display device integrated into the document is an active or passive matrix display or a segment display.

In particular, the display device can be an electrophoretic or electrochromic display, a bistable display, a rotational element display, in particular so-called electronic paper (e-paper), an LED display, in particular an inorganic, organic or hybrid LED display, an LCD display in various forms of embodiments (for example, twisted nematic, super twisted nematic, cholesteric, nematic), a ferro-electric display, a display based on electro-wetting effects, a display based on interferometric modulator elements (IMOD), a hybrid display or a display based on a flexible display, as available commercially, for example, from the company Citala (www.citala.com) (compare US 2006/0250535 A1 and WO 2007/054944).

The data stored in the document can have various contents that are suitable for the generation of an image rendition on the display device. This means, for example, digital images, in particular facial images of a person, codes of arms, seals, textual information, barcodes, identification, in particular motor vehicle identification or the like.

According to an embodiment of the invention, the information that is displayed on the display by the display elements due to the delay of the emission of the optical signals is personalizing information, a security feature and/or a cryptographic key.

The personalization information can, for example, be statements about the carrier of the document such as, for example, the name of the carrier, place of residence, height, age, sex, weight or similar. This information can be displayed entirely or partially in clear text in the rendering of the stored data on the display device.

According to an embodiment of the invention, the information is a security characteristic such as, for example, a code of arms, a seal or similar. This information is displayed, for example, by the spatial location of the image elements of the subset.

According to an embodiment of the invention, the information is a cryptographic key. The cryptographic key can be a symmetric or asymmetric key. The cryptographic key is captured by a reader so that the reader can execute a cryptographic protocol together with the document.

According to an embodiment of the invention, the information is a motor vehicle parameter and/or a fee status of the motor vehicle. The document, in particular in the embodiment as electronic motor vehicle identification, can be affixed to the motor vehicle or to a part of the motor vehicle.

A motor vehicle parameter can be, for example, the speed of the motor vehicle, the noise level or the exhaust level. In particular, the information can indicate which exhaust emission level is met by the motor vehicle, especially according to the directive for particulate matter that is in force.

By displaying the fee status it can be displayed if the required fees, taxes and/or levies, in particular tolls, motor vehicle taxes and/or emission fees have been paid for the motor vehicle.

According to an embodiment of the invention, the document has a protected memory area in which additional data are stored. Further, the document has an interface for reading access of the reader to these additional data. The interface can require contact or be contactless; in particular it can be designed as an RFID interface. Further, the interface can also be designed as a so-called dual mode interface. The interface can be based on an electric, capacitive, inductive, magnetic, optic or other physical coupling method. For contactless coupling by means of an antenna, such can, for example, be designed as an inductor, dipole or be in the form of capacitive surfaces.

Requirement for reading access of the reader to the additional data is a prior successful execution of the cryptographic protocol. The cryptographic protocol can, for example, be a so-called challenge response method. As a result of the cryptographic protocol, the additional data are protected against unauthorized access. This in particularly advantageous when the third data are sensitive data such as, for example, biometric data, in particular fingerprint data or scan data of the iris of the carrier of the document.

In accordance with the invention "document" means, among other things, paper-based and/or plastic-based documents such as, for example, identification documents, in particular passports, personal identification documents, visas, drivers licenses, motor vehicle registration certificates, motor vehicle titles, company identification, health cards or other ID documents as well as also chip cards, payment means, in particular bank cards and credit cards, bills of lading or other certificates.

The term "document" also means an electronic identification, in particular an electronic motor vehicle identification. The document can also form an integral part of a means of transportation, in particular of a motor vehicle. For example, the document can be integrated into the front opening hood or covering hood or into the so-called frontend or backend, by inserting or applying a display in accordance with the invention.

The document can also be metal-based, in particular based on sheet metal; it can also have a document body made of sheet metal. But it can also have a document body made of a different material such as, for example, a composite material of the type used in vehicle construction.

In a further aspect, the invention relates to a reader for a document. The reader has a sensor for capturing the delays of the light radiated by the display device, as well as decoding means for decoding the information coded by the delays.

According to an embodiment of the invention, the reader is designed to verify the document with the help of the information. For example, the reader compares the information received with reference information. Sufficient agreement between the information received and the reference information is the prerequisite for recognizing the document as being authentic.

According to an embodiment of the invention, the reader has means for executing a cryptographic protocol using the information received. This information is, for example, a cryptographic key. Because of the capturing of the cryptographic key, the reader can execute the cryptographic protocol with the document. After successful execution of the cryptographic protocol, the reader can access a protected memory area of the document in order to read data that is located there.

According to an embodiment of the invention, the reader is designed for capturing the document of a means of transportation that is passing; in this embodiment, the document is, for example, designed as electronic motor vehicle identification. The reader can, for example, be used for capturing a motor vehicle parameter, a driving parameter or a fee status of the motor vehicle, in particular for conducting traffic controls, exhaust controls and/or fee controls.

In a further aspect, the invention relates to a method of verifying a document. For the verification of the document, the information received by the display device is compared with reference information. In addition to the chronological delay captured by the display device, the captured spectral characteristic of the irradiation components can also be used for the verification.

BRIEF DESCRIPTION OF THE DRAWINGS

In the following, embodiments of the invention will be explained in further detail by referring to the drawings. Shown are.

DETAILED DESCRIPTION OF THE INVENTION

Elements of the following embodiments that correspond to each other are identified with the same reference numbers.

Figure 1:
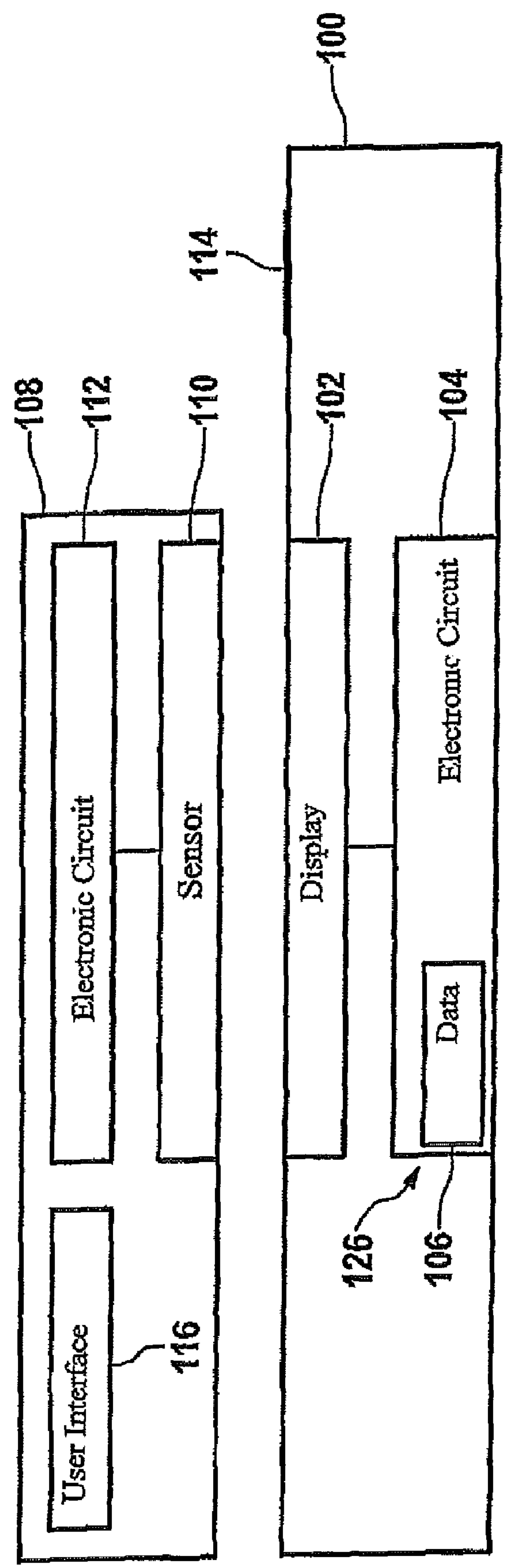
FIG. 1 A block diagram of an embodiment of a document in accordance with the invention, FIG. 2 a block diagram of an embodiment of the display device in accordance with the invention, FIG. 3 the time-resolved intensity profile of various types of display elements, FIG. 4 a signal diagram to illustrate the line-driving within an image regeneration period, FIG. 5 a signal diagram for the illustration of a line-driving of display elements with and without chronological delay, FIG. 6 a block diagram of a further embodiment of a document in accordance with the invention.

FIG. 1 shows a document 100 with a display 102 that is integrated into the document body of document 100 and an electronic circuit 104 for activating display 102. Display 102 includes a number of display elements that can be configured, for example, like a matrix. In particular, display 102 can be a passive or an active matrix display.

Electronic circuit 104 includes one or several electronic memories 126, in particular for storing data 106. The electronic circuit 104 can access the data 106. In particular, the electronic circuit 104 is for the purpose of accessing the data 106, in order to activate display 102 to render the data 106, so that a user of the document 100 can perceive the rendering of the data 106.

The data 106 can be, for example, image data. Here, "image data" means data that are suitable for rendering on a display 102, i.e. for example, a digital photograph, textual information, identification, in particular motor vehicle identification, a one or two-dimensional barcode or the like.

The electronic circuit 104 is designed in such a way that during the image regeneration period, all display elements of display 102 are activated once in order to thus render the data 106 on display 102. This can take place at an image regeneration frequency of, for example, 25 Hz or 50 Hz.

Each of the display elements of display 102 is designed to emit an optical signal. As a result of the activation of the display elements by the electronic circuit 104, the data 106 that are stored in the document are rendered, so that a user can visually perceive them. For example, this takes place in such a way that within an image regeneration period, the display elements are activated line-wise, in order to build a full image on the display 102 within one image regeneration period.

The display 102 is designed in such a way that the emission of the optical signals from a subset of its display elements for building a full image takes place within one image regeneration period with a chronological delay. The information on display 102 can contain coded information contained in the length of the chronological delays and/or spatial configuration of the display elements of this subset.

The reader 108 has an optical sensor 110 such as, for example a CCD sensor or an optical scanner. The sensor 110 is designed to capture the optical signals emitted by the display elements of display 102.

In a different embodiment in accordance with the invention, the sensor 110 can consist of a semiconductor detector, for example, a phototransistor, photodiode (in particular avalanche photodiode) or a photoconductive cell, or a secondary electron multiplier (photon multiplier, PMT), which makes time-resolved detection possible. A further component of the sensor 110 can include a filter, a dispersive element (for example, a prism) and/or a diffractive element (for example, a grid), in order to select the spectral section. For example, in the above mentioned example for luminescent substances containing europium, a so-called longpass filter can be used, which is permeable only by light at wavelength of, for example, larger than 600 nm, which is then, for example, detected time-resolved by a photodiode.

The sensor 110 can, for example, be designed for the detection of UV, visible and/or IR light. In one embodiment, the detected light can have been emitted by the display device. In a further embodiment, the reader has an illumination source, which irradiates the document. The document can emit this irradiation again in unchanged or changed form. The sensor can thus capture the transmission, emission or the reflection using a measurement technique. The illumination source can be a thermal emitter (for example an incandescent lamp, Nernst lamp) an LED (inorganic, organic or hybrid) a laser, a gas discharge lamp (for example cold cathode lamp, sodium discharge lamp) or a combination of such. These can be provided with a filter, a dispersive element (for example, a prism) and/or a diffractive element (for example, a grid), in order to select a spectral range. Preferred are individual wavelength ranges of wavelength or continuous spectra between 190 nm and 2,500 nm, preferably between 250 nm and 1,250 nm.

The reader 108 can have an illumination source. The illumination source can be, for example, a thermal emitter, in particular an incandescent lamp, Nernst lamp, an LED, in particular inorganic, organic or hybrid LED, a laser, a gas discharge lamp, in particular a cold cathode lamp, sodium discharge lamp or a combination of these.

The sensor 110 is connected with an electronic circuit 112 of reader 108. Electronic circuit 112 analyzes the optical signals captured by sensor 110, in order to capture the chronological delay, at which the display elements of the subset emit the optical signals. The electronic circuit 112 can contain a decoder for decoding the information contained in the chronological delays and/or in the configuration of the display elements of the subset that have emitted the chronologically delayed optical signals. Reference information can be stored in the electronic circuit 112.

In one embodiment, the electronic circuit 112 performs the adaptation of an exponential function to the time-resolved intensity profile measured by sensor 110 for the switch-on process and/or the switch-off process, in order to detect the chronological delay. The different chronological delays are given here by the differing steep rise or fall of the intensity of the irradiation of the display elements when switching on or switching off.

Further, the reader 108 has a user interface 116. Alternatively or additionally, the reader 108 can also have an interface to a computer and/or a network.

The reader 108 can capture the rendering of display 102 with a sensor 110. This can take place permanently, so that the reader 108 continually optically senses the rendering generated by display device 102. For this, sensor 110 is, for example, designed as a high-speed camera.

For example, the captured information is personalization information. This personalization information can be indicated in document 100 as imprint 114 in clear text. By comparing the personalization information displayed by the user interface 116 with the personalization information indicated in the imprint 114 of document 100, a test of the authenticity of the document can take place, as the personalization information that is optically captured by sensor 110 from the chronological delay of the display elements of the subset which are displayed by the interface 116 of the reader 108, must agree with the personalization information shown on imprint 114.

The information can consist of a code of arms, a seal or a different security characteristic. The rendering of this security characteristic is captured by sensor 110 of the reader 108 and compared by means of the electronic circuit 112 with the reference information stored there. If the optically captured security characteristic sufficiently agrees with the reference information, an acoustic or optical signal is emitted via user interface 116 which displays whether document 110 has passed the authenticity test or not.

For example, all display elements of the subset emit their respective optical signals within one image regeneration period with the same chronological delays. In this case, as a result of the spatial configuration of the display elements of the subset on the display 102, the security characteristic can be built.

The electronic circuit 104 can also be designed in such a way that it emits a trigger signal directly prior to an image regeneration period, which, for example, is transmitted wireless or optically to the electronic circuit 112 of the reader 108. Only because of this trigger signal, the electronic circuit 112 starts the optic capture of the rendering of display 102 with the help of sensor 110, in order to capture the optical signals emitted by the display elements of display 102 during the subsequent image regeneration period. In this embodiment, the sensor 110 can, for example, be designed as a time-gated sensor, in particular as a time-gated CCD camera.

Alternatively, the reader 108 can be designed in such a way that it generates this trigger signal for document 100. In this case, the trigger signal is, for example, transmitted wireless from the electronic circuit 112 to the electronic circuit 104. Thereupon, the electronic circuit 104 starts an image regeneration period, within which a full image is built for rendering the data 106. Further, as a result of the trigger signal in reader 108, electronic circuit 112 starts the optic capture of the rendering of display 102 by means of sensor 110.

Figure 2:
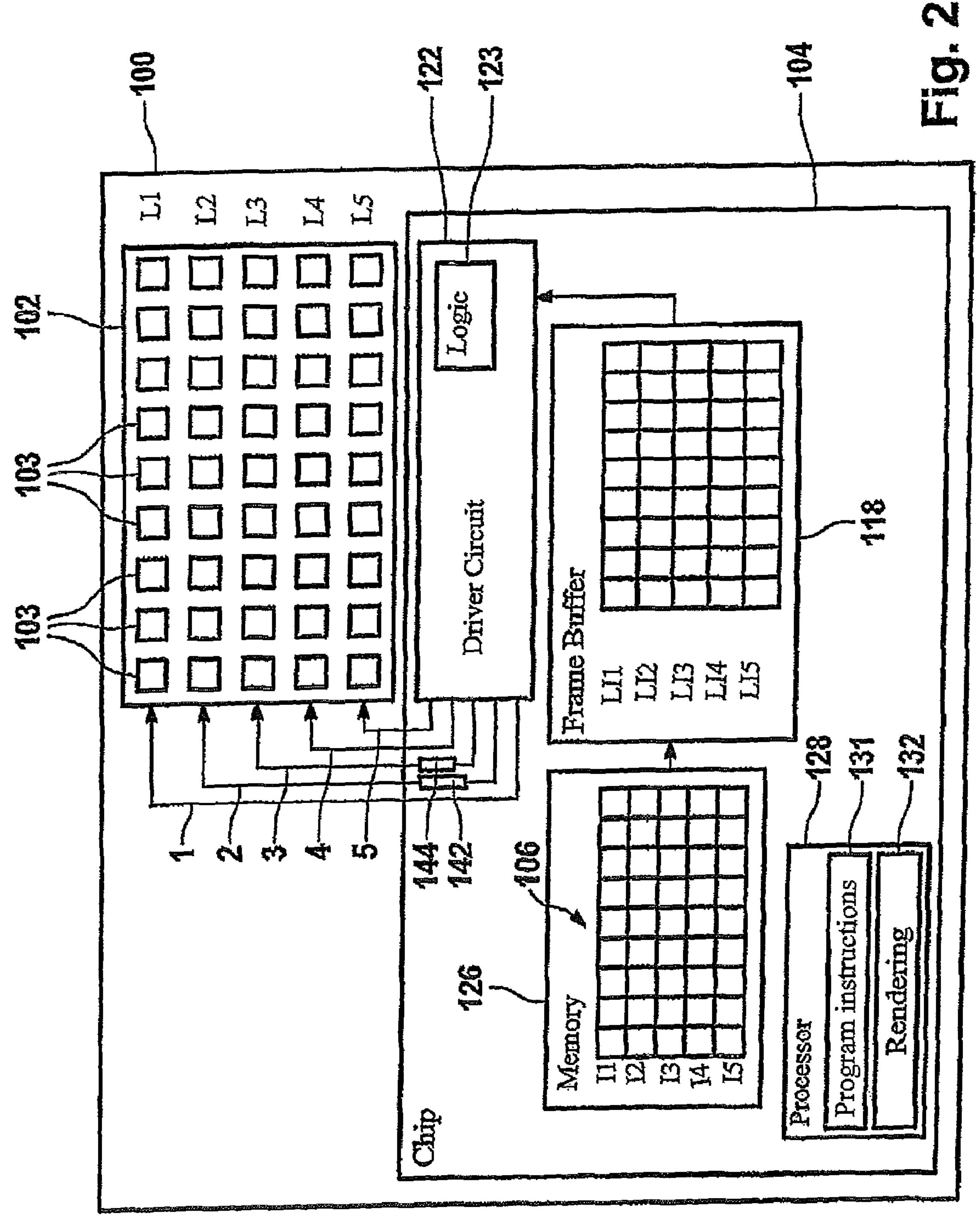

FIG. 2 shown an additional embodiment of document 100. The display 102 of document 100 contains several display elements 103, which are configured in a matrix. The matrix formed by the spatial configuration of the display elements 103 has a number of lines n L1 to Ln, whereby in the embodiment in FIG. 2, n=5. In other embodiments, a significantly larger value can be selected for n.

Here, the electronic circuit 104 of document 100 is designed as chip, in particular as RFID chip. The electronic circuit 104 consists of a driver circuit 122 for activating display 102. For this purpose, the driver circuit 122 contains a driver logic 123.

The driver circuit 122 is connected by means lines of matrix 1, 2, 3, 4 and 5 with display 102, to respectively activate one of the lines of display 102. Alternatively or additionally, the activation of the display elements 103 can take place via the column lines. But the presence of column lines is not absolutely required, in particular not then, when the lines of the matrix 1, 2, 3, 4 and 5 are designed as data busses for the activation of all display elements 103 of the affected line.

The electronic circuit 104 further has a processor 128 for the execution of program instructions 131, which implement a control program, as well as for executing program instructions 132, which decode data 106. This decoding is also described as rendering. For example, the data 106 are present in a standardized coded data format, i.e. for example in JPEG, GIF or TIFF. Program instructions 131 can decode data 106.

The electronic circuit 104 further has a buffer memory 118, for example, a so-called frame buffer.

In the embodiment of FIG. 2, the driver logic 123 is designed to activate the display elements in the sequence of their spatial configuration, i.e. the driver logic 123 is designed in such a way that within one image regeneration period, the display elements of the lines L1, L2, L3, L4 and L5 are activated sequentially in this sequence.

In memory 126, those data 106 are stored that have image lines I1, I2, I3, I4 and I5. For the rendering of data 106 on display 102, these are decoded by executing program instructions 132 and stored in the corresponding lines LI1, LI2, LI3, LI4 and LI5 of the frame buffer 118.

The driver logic 123 accesses the frame buffer 118, in order to activate its lines in the sequence of LI1, LI2, LI3, LI4 and LI5 the corresponding lines L1, L2, L3, L4 and L5 of display 102 sequentially within an image regeneration period. As the result of this activation, the display elements 103 of a line emit its optical signals, which are required for the construction of the full image for rendering data 106.

In the embodiment of FIG. 2, the delay of the optical signal emission of the display elements of the subset takes place by line. For this, the lines of the matrix 2 and 3 respectively contain a delay element 142 or 144. The display elements of line L2 and L3 thus form the subset here.

For example, the delays of delay the elements 142 and 144 can be firmly specified. In particular, the delay elements 142, 144 can be realized by an even-numbered serial circuit of inverters, whereby each of the inverters contributes to the delay of the signal transmission by the driver circuit 122 to the affected line of the display 102. The delay of the delay elements 142, 144 can also be variable as the result of building a control voltage which is, for example generated by the driver circuit.

Alternatively, the chronological delay of the emission of the optical signals by the display elements of the subset, i.e. here the display elements of lines L2 and L3, are implemented on the level of the driver logic 123. To do so, the driver logic 123 is designed in such a way that the activation of the lines of the matrix 2 and 3 respectively takes place with a chronological delay.

The information that is to be displayed by means of the chronological delay can be variable. In this case, the driver logic 123 changes the selection of the lines that are activated with chronological delay, and/or the length of the chronological delay of the activation, in order to thus code the changed information.

The information that is supplied by the driver logic 123 on display 102 as a result of variations of the chronological delays can also be a motor vehicle parameter and/or a fee status. In this embodiment, the document 100 is designed as an electronic motor vehicle identification, which is attached to a motor vehicle or which forms an integral part of the motor vehicle.

For example, the driver logic 123 or the electronic circuit 104 can have an interface with a motor vehicle electronic device, which sends the information that is to be displayed to the interface of the electronic circuit 104 in regular or irregular intervals. The motor vehicle electronic device can, for example, be a so-called electronic control unit (ECU). The motor vehicle electronic device can be networked with a motor vehicle bus system with the electronic switch 104, in order to transmit the information that is to be displayed via the motor vehicle bus system. The electronic circuit 104 can internally transmit the information received to the driver logic, so that it correspondingly performs these chronological delays of the activation of the display.

For example, the motor vehicle electronic device can serve the purpose of capturing a motor vehicle parameter, and do so specifically on the basis of sensor signals. For example, one sensor is for capturing a current exhaust level of the motor vehicle. This current exhaust level is transmitted in the form of information by the motor vehicle electronic device to the electronic circuit 104, so that the exhaust level is displayed on display 102. For additional motor vehicle parameters such as, for example, speed, the actual noise level generated by the motor vehicle or other environmental or safety parameters of the motor vehicle can be dealt with correspondingly.

Alternatively or additionally, the motor vehicle electronic device is designed for determining a fee status. For example, the motor vehicle electronic device determines whether a required fee such as, for example, a toll, a tax or exhaust fee has been paid on behalf of the motor vehicle or is to be paid. Corresponding information that indicates the fee status is transmitted by the motor vehicle electronic device to the electronic circuit 104, so that this information can be displayed on display 102.

Correspondingly, the reader 108 (compare FIG. 6) for capturing the information that is displayed by display 102, can be formed by a standing and/or a moving motor vehicle. The reader 108 can be connected to a network with a central server computer in which information captured by display 102 is analyzed.

Hereby, the data 106 can be the official motor vehicle identification. Thus on display 102, the official motor vehicle identification is visually displayed, as well as in addition one or more pieces of information that cannot be visually perceived without a reader. In this embodiment, an update of the official identification can take place thereby, that an update of the data 106 is made, for example, by sending data that contain the up-to-date official identification from the motor vehicle electronic device via the motor vehicle bus system to the electronic circuit 104, which then overwrites data 106 with the data that is received.

Display 102 can be designed as so-called active matrix. In this case, each display element 103 has an associated so-called activation circuit that can be activated via each line of the matrix and a column line of the driver circuit 122. In this case, the chronological delay can be realized on the level of the activation circuit of the display elements of the subset. For example, the activation circuits of the display elements of the subset are connected with the affected lines of the matrix and column lines by delay elements corresponding to the delay elements 142, 144.

Alternatively, it is also possible to implement the chronological delay not on the level of the activation, but on the level of the display elements 3 themselves. Each of the display elements 103 has a response characteristic, i.e. a transmission function that indicates the chronological progression of the emission of an optical signal upon the activation of this display element 103. The display elements 103 of the subset are designed in such a way that they have a response behavior which deviates from the response behavior of the remaining display elements 103 of display 102. This response behavior is delayed, as a result of which the chronological delay of the emission of the optical signals by these display elements 103 of the subset is given.

Figure 3:
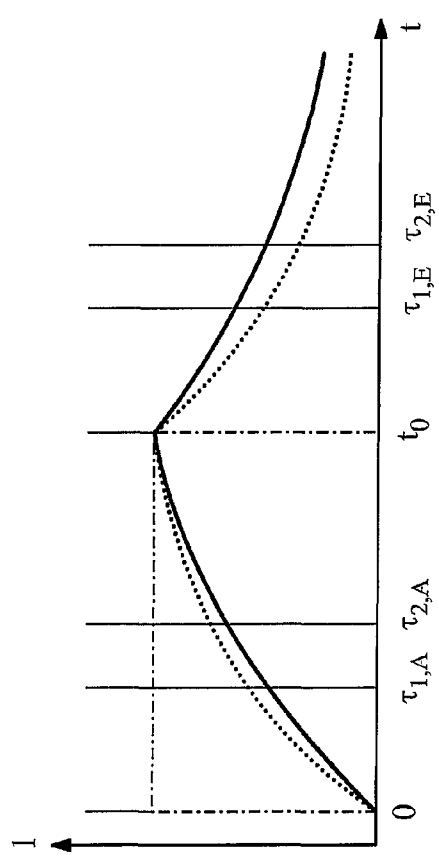

Such a chronological progression of the response behavior is illustrated by way of example in FIG. 3 for three different types of display elements. A first type (dotted line) of display elements has a first half-life of $\tau_{1,A}$ for the build-up of the signal, as well as a half-life of $\tau_{1,E}$ for the decay of the signal. A second type (solid line) of display elements has a first half-life of $\tau_{2,A}$ for the build-up of the signal, as well as a half-life of $\tau_{2,E}$ for the decay of the signal. Compared to the first type, the second type has a delayed switch-on and switch-off behavior. A third type (dashed-dotted line) of display elements is assumed idealized with an erratic switch-on and switch-off behavior.

The surface under all three curves and thus the number of the emitted and perceived photons and thus the impression of brightness is identical for all three curves. Thus, the observer can distinguish the first, second and third type of display elements without technical aids.

For example, the delayed response behavior of display elements 103 of the subset is achieved thereby, that for these display elements 103 a different luminescent substance is used that has a longer fade-out time than for the other display elements 103, that are not a part of the subset. Such a luminescent substance with a longer fade-out time has a correspondingly delayed response behavior.

Alternatively, the same luminescent substance is used for all display elements 103 such as, for example europium, whereby the respective response behavior is varied by using different host crystals.

As a first approximation of the behavior of such luminescent substances, for the switch-on as well as for the switch-off process, a mono-exponential progression can be assumed. An adaptation of the measured time-resolved intensity profile takes place accordingly as per formulas a and b.

exponential accretion $1=1_{saturation}*(1-e^{-\tau/t})$ Formula [a]:

1=intensity of luminescence at point in time t $1_{saturation}$=intensity of luminescence at saturation (excitement and emission in equilibrium)

τ time constant t=time exponential decay $1=1_0*e^{-\tau t^*t})$ Formula [b]:

1=intensity of luminescence at time t $1_0$=intensity of luminescence at t=0

τ=time constant t=time

For more complex systems, adaptations can be made with multi-exponential decays. These are known to the person skilled in the art.

The variations of life cycles can be arranged by using various materials, for example, different host grid systems, spatial configuration, e.g. in type II semiconductors or by intra-molecular energy transfer (FRET, in particular spFRET). Additional possibilities of variations result from targeted chemical traces of metals in polymers.

When using emissive display devices, in particular OLEDs, different emitter materials can, by all means, have a similar or even an identical emission spectrum and still differ significantly in their chronological luminescent behavior. Depending on the life cycle of the excited condition, a differentiation is made between fluorescence and phosphorescence. Fluorescent materials have life cycles of $<10^{-6}$ s and phosphorescent materials of $>10^{-6}$ s.

Of the prevalent OLED materials, particularly the so-called Triplett materials have the potential of simultaneously being used as security feature. These materials distinguish themselves by their phosphorescence. They differentiate themselves with respect to fluorescence essentially by the magnitude of longer life cycles of the excited condition. While the transition of the excited condition to the basic condition in phosphorescence is described as forbidden (the so-called Triplett condition), it is allowed in fluorescence (the singlet condition).

In prior art, a number of so-called Triplett OLED materials are known. In particular, derivatives of poly(p-phenylene-vinylene) (PPV) are suitable. Additional lines of material are, for example, triphenylamine dimers, N,N'-bis (3 methylphenyl)-N,N'-bis(phenyl)-benzidine (TPD), fac tris(2-phenylpyridine) iridium ($Ir(ppy)_3$) doped TPD, and platinum octaethyl porphine (PtOEP) doped TPD (Tsuboi, Taiju; Murayama, Hideyuki; Penzkofer, Alfons (2006) *Photoluminescence Characteristics of Ir(ppy)3 and PtOEP doped in TPD Host Material*. Thin Solid Films, 499 (1-2). pp. 306-312. ISSN 0040-6090).

In prior art, the decay constants for OLEDs only play a role to the extent that the materials for certain applications (e.g. TV) should not decay too slowly (fade-out). In contrast to that, in accordance with the invention, information and/or a security features can be coded by means of the accretion and decay behavior.

Figure 4:
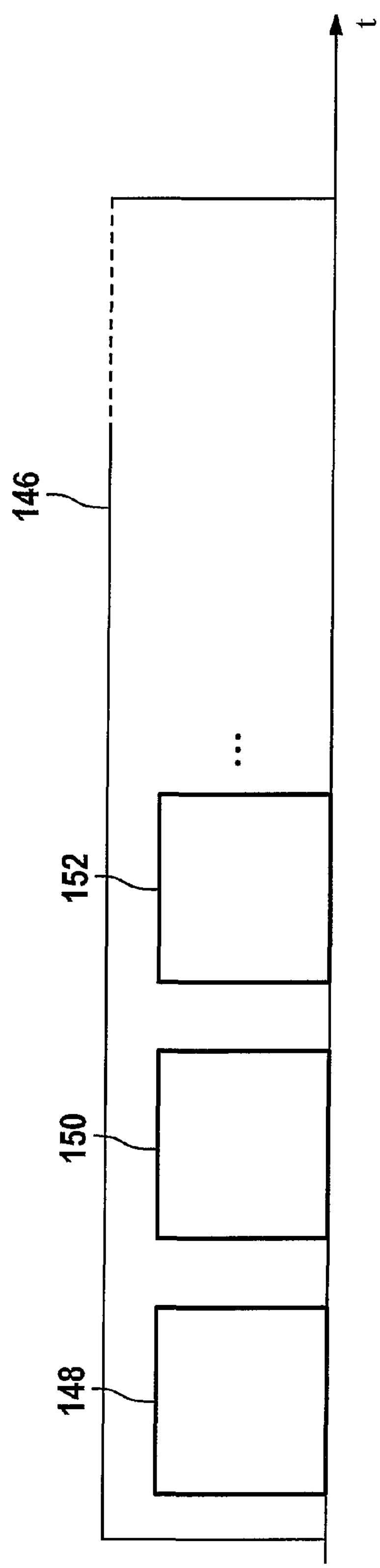

FIG. 4 shows a signal diagram to illustrate an image regeneration period 146. The image regeneration period 146 includes chronologically equidistant activation periods of the lines of the matrix 148, 150, 152, . . . , within which the lines L1, L2, L3, . . . (compare FIG. 2) are sequentially activated.

Figure 5:
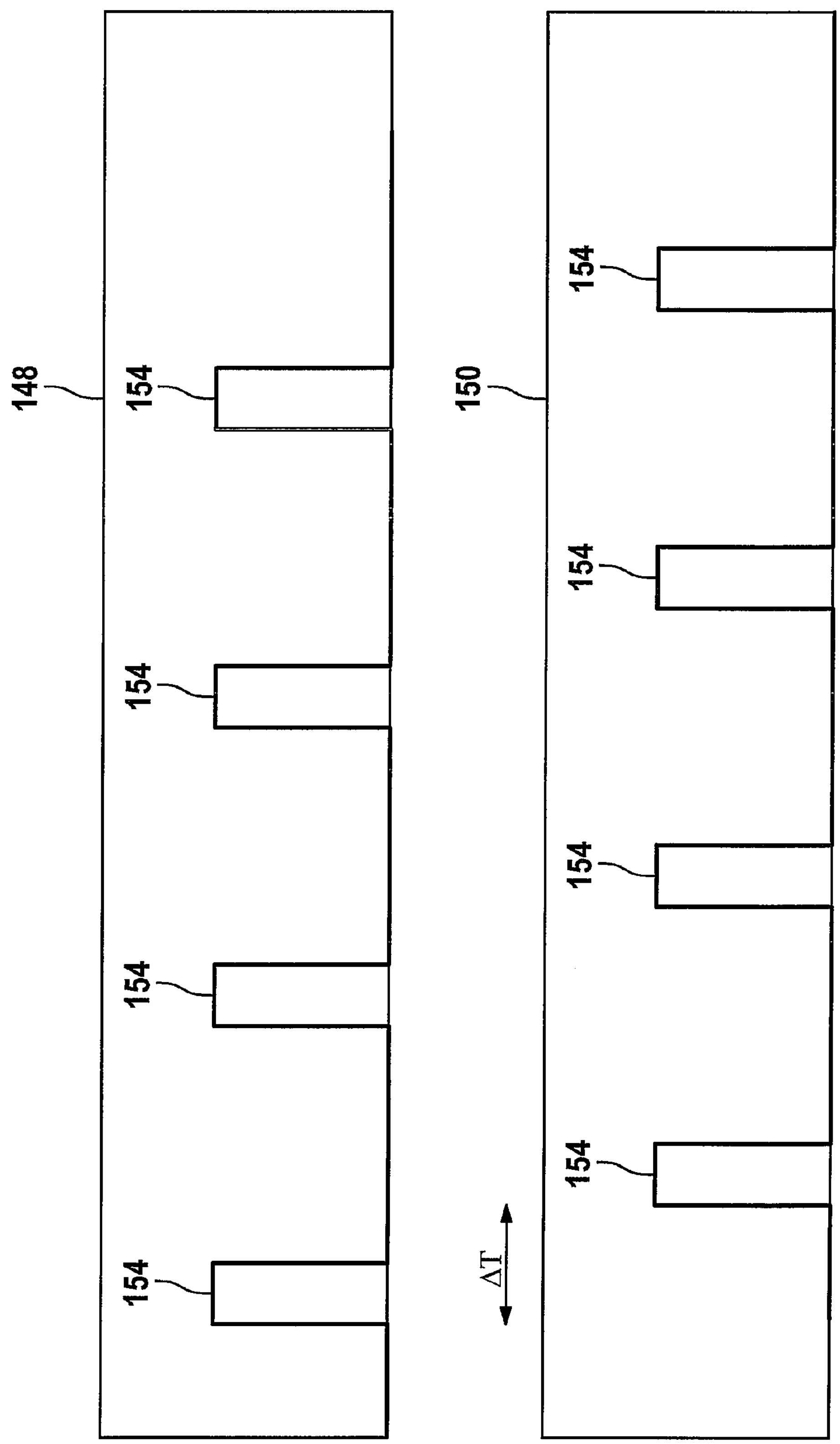

FIG. 5 shows an example of the activation period of the line of the matrix 148 for activating line L1 and the subsequent activation period of the line of matrix 150 for activating line Z2.

Within the activation period of the line of the matrix 148, the display elements 103 of line L1 are sequentially activated with the chronologically equidistant pixel signals 154. Hereby, the intensity of the optical signals that are to be respectively emitted by the display elements 103 is specified. The timing of the activation periods of the lines of the matrix 148, 150, 152, . . . and the pixel signals 154 within the image regeneration period 146 is thereby firmly predefined.

Deviating from this firmly predetermined timing of the activation of the display elements 103, the activation of the display elements 103 of line L2, which are a part of the subset, takes place at a chronological delay ΔT, as shown in FIG. 5. This chronological delay ΔT is the result of the delayed transmission of the activation signal which is transmitted for the activation of line L2 by the driver circuit 122 by the line of the matrix 2 to line L2, as in line of matrix 2, the delay element 142 is located. Alternatively, the delay ΔT can also take place by means of a correspondingly delayed signal generation of the activation signal by the driver logic 123.

Figure 6:
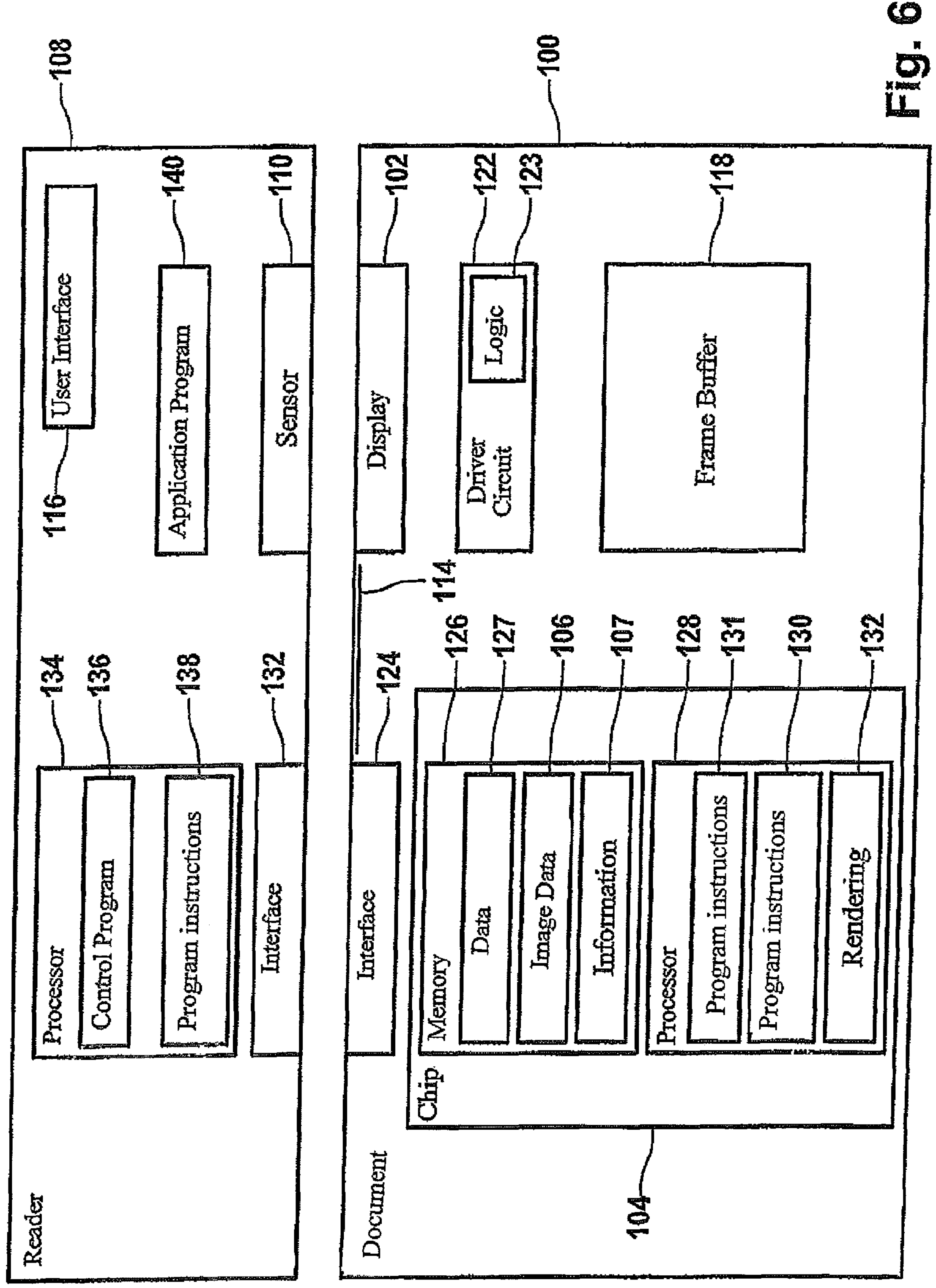

FIG. 6 shows an additional embodiment of a document 100 in accordance with the invention and a reader 108 according to the invention.

Here, the electronic circuit 104 of document 100 is designed as chip, in particular as RFID chip. The electronic circuit 104 is connected with an interface 124 of document 100 for communication with the reader 108. The interface 124 can have, for example, one or more antenna windings that extend in a margin section of document 100.

The circuit 104 has an electronic memory 126 for storing data 127 in need of protection. Data that in need of protection 127 can be, for example, biometric data of the carrier of the document 100 such as, for example, fingerprint data, scanned data of the iris or similar. The data in need of protection 127 are stored in an especially protected memory section of memory 126.

Further, in the same memory 126 or in a different electronic storage device of document 100, the data 106 and the information 107 are stored. Circuit 104 further has a processor 128 for executing program instructions 130, as a result of which the steps of a cryptographic protocol that concern the document are implemented. Processor 128 further serves to execute the program instructions 131, which implement a control program.

The reader 108 has an optical sensor 110 for capturing the optical signals radiated by the display elements 103 (compare FIG. 2) of display 102. The optical sensor 110 can be a CCD sensor or a scanner.

The reader 108 further has an interface 132, which corresponds to the interface 124 of document 100. For example, the interface 132 is designed for RFID communication with document 100 or its circuit 104. The interfaces 124, 132 can be with contact or contactless or also be designed as dual mode interface. The interfaces 124, 132 can be based on an electric, capacitive, inductive, magnetic optic or a different physical coupling method. For contactless coupling by means of an antenna, such can, for example, be designed as an inductor, dipole or in the form of capacitive surfaces.

Document 108 has at least one processor 134 for executing the control program 136 as well as program instructions 138, by means of which the steps of the cryptographic protocol that affect the reader 108 are implemented. Further, the reader 108 can serve to execute an application program 140. The application program 140 can also be executed by a different computer system, which is connected with the reader 108.

The control program of document 100, which is implemented by program instructions 131 is designed in such a way that it activates the driver circuit 122 to render the data 106. The driver circuit thereby accesses information 107, in order to accordingly code the delays of the activation of the display elements of the subset. Alternatively, the delay can also be firmly predetermined, whereby then the coding of the information takes place by means of a selection of the display elements, which are activated delayed within an image regeneration period.

To access the data 127 of memory 126, the reader 108 first captures display 102 by means of its optical sensor 110. For this, the sensor 110 is correspondingly activated by control program 136. The control program 136 decodes the information coded in the delay and/or the configuration of the display elements 103 of the subset in order to thus receive the information. In this way, the control program 136 receives information about the cryptographic key.

After capturing the cryptographic key, the control program 136 starts the execution of the program instructions 138, so that the cryptographic protocol between the reader 108 and the document 100 is executed with the help of the cryptographic key. For example, the cryptographic protocol is a challenge/response process.

The challenge/response process can, for example, progress in such a way that the reader 108 first sends a request of data 127 to the interface 124 of document 100. Thereupon, the execution of the program instructions 130 is started. Hereby, the document 100 generates, for example, a random number, which is symmetrically encrypted with a reference value of the cryptographic key, so that a chiffre [code] results. The encrypted random number, i.e. the chiffre, is sent by interface 124 of document 100 to interface 132 of reader 108.

As a result of the execution of the program instructions 138, the reader 108 decrypts the chiffre received by document 100 with the help of the previously received cryptographic key. The result of the decryption is sent by interface 132 to interface 124 of the document 100.

With the help of the program instructions 130, the document 100 then tests if the result of the decryption of the chiffre, which had been received by the document from the reader 108 is identical with the random number initially generated by document 100. If this is the case, the reference value of the cryptographic key that is contained in the program instructions 130, or which can be accessed by these, agrees with the cryptographic key of the image rendition of display 102 captured by reader 108, as a result of which the authenticity of the document 100 and the right of access of the reader 108 is given.

Thereupon, document 100 transmits the data 127 of memory 126 that have been requested by reader 108 from interface 124 to interface 132. These data can be transmitted by the control program 136 to the application program 140 for further processing. For example, the data are displayed on a monitor mask.

Before the date are transmitted out of memory 126 to the reader 108, additional tests can be required such as, for example, a per an EAC method. Alternatively or additionally, a cryptographic protocol that is based on a asymmetric key can also be used.

REFERENCE NUMBERS

1 Line of matrix
2 Line of matrix
3 Line of matrix
4 Line of matrix
5 Line of matrix
100 Document
102 Display
103 Display element
106 Data
107 Information
108 Reader

110 Sensor
112 Circuit
114 Imprint
116 User interface
118 Frame buffer
122 Driver circuit
123 Driver logic
124 Interface
126 Memory
127 Data
130 Program instructions
131 Program instructions
132 Program instructions
134 Processor
136 Control program
138 Program instructions
140 Application program
142 Delay element
144 Delay element
146 Image regeneration period
148 Line-driving period
150 Line-driving period
152 Line-driving period
154 Pixel signal

What is claimed is:

1. A document comprising an integrated display device, that comprises several display elements that can be activated, whereby each of the display elements is designed to emit an optical signal for a rendering of the first data that are stored in the document, whereby the display device is designed for cyclical activation of the display elements for rendering the first data in sequential image regeneration periods, and whereby the display device is designed in such a way that the emission of the optical signals of at least a subset of the display element takes place with a chronological delay, whereby it is not possible to visually perceive the chronological delay and whereby information is coded into the length of the chronological delay and whereby information is coded into the configuration of the display elements of the subset.

2. A document according to claim 1 comprising means for delaying the activation of the display elements that belong to the subset.

3. A document according to claim 1, whereby the display elements are located in an active matrix, whereby each of the display elements has an associated activation circuit, and whereby the activation circuits of the display elements that belong to the subset include means for delaying the activation.

4. A document according to claim 1, whereby the display elements of the subset have a response characteristic that leads to the delay and whereby the display elements are provided with a luminescent substance for generating the optical signal, and whereby the display elements of the subset have a first host crystal for the luminescent substance and whereby the remaining display elements that do not belong to the subset have a second host crystal for receiving the luminescent substance, whereby the first and second host crystals are different.

5. A document according to claim 1, whereby the display device is provided with a section in which no display elements of the subset are located.

6. A document according to claim 1, whereby the information is personalization information and the information is a security characteristic comprising a cryptographic key.

7. A document according to claim 1, whereby as a result of the chronological delay, information is displayed, whereby the information is changeable chronologically and with means to vary the chronological delay for displaying the chronologically changeable information.

8. A document according to claim 1, whereby the document comprises an integrated electronic circuit and a memory for storing data in need of protection and means for executing a cryptographic protocol, and with an interface to a reader, whereby access of the reader to the data in need of protection via the interface requires the execution of the cryptographic protocol with the help of the information.

9. A document according to claim 1, whereby it is an electronic identification of a motor vehicle.

10. A document according to claim 1, whereby the first data are an identification of a vehicle and whereby as a result of the chronological delay, information is displayed, whereby this information is a vehicle parameter and/or a fee status.

11. A reader for a document according to claim 1 comprising an optical sensor for capturing the chronological delay of the emission of the optical signals by the subset of the display elements.

12. A reader according to claim 11, whereby the capturing of the chronological delay takes place by capturing a time-resolved intensity profile of the radiation emitted by the display elements.

13. A reader according to claim 11, comprising means for verification of the document with the help of the chronological delays captured by the display device.

14. A reader according to claim 11 comprising means for executing a cryptographic protocol and an interface for communication with the document, whereby access to the data that is in need of protection of the document requires that the cryptographic protocol has been executed successfully with the help of information captured by the chronological delay.

15. A method for the verification of a document according to claim 1 including the following steps:

capturing the chronological delays of the emission of the optical signals by the display elements of the subset in an image regeneration period, reviewing reference information with the help of the chronological delay.

* * * * *